(12) United States Patent
Cheung et al.

(10) Patent No.: US 11,843,322 B2
(45) Date of Patent: Dec. 12, 2023

(54) POWER CONVERTER APPARATUS AND A METHOD OF MODULATING THEREOF

(71) Applicant: Hong Kong Applied Science and Technology Research Institute Co., Ltd., Shatin (HK)

(72) Inventors: Sui Pung Cheung, Kowloon (HK); Qing Chun Li, Guangdong (CN); Tin Ho Li, Tseung Kwan O (HK)

(73) Assignee: Hong Kong Applied Science And Technology Research Institute Co., Ltd, New Territories (HK)

( * ) Notice: Subject to any disclaimer, the term of this patent is extended or adjusted under 35 U.S.C. 154(b) by 201 days.

(21) Appl. No.: 17/513,148

(22) Filed: Oct. 28, 2021

(65) Prior Publication Data
US 2023/0134538 A1    May 4, 2023

(51) Int. Cl.
*H02M 7/12* (2006.01)
*H02M 7/217* (2006.01)
*H02M 1/00* (2006.01)

(52) U.S. Cl.
CPC ......... *H02M 7/2173* (2013.01); *H02M 1/007* (2021.05)

(58) Field of Classification Search
CPC ...... H02M 7/155; H02M 7/12; H02M 7/2173; H02M 1/007; H02M 1/0067
See application file for complete search history.

(56) References Cited

U.S. PATENT DOCUMENTS

| 7,274,112 B2 * | 9/2007 | Hjort | H03K 17/687 |
| | | | 307/64 |
| 7,948,222 B2 | 5/2011 | Hardman et al. | |
| 8,476,879 B2 | 7/2013 | Gaboury et al. | |
| 9,344,000 B2 * | 5/2016 | Kim | H02M 7/23 |
| 9,515,563 B2 * | 12/2016 | Kim | H02M 7/23 |
| 11,011,992 B2 | 5/2021 | Liu et al. | |
| 11,043,891 B1 | 6/2021 | Cheung et al. | |
| 11,292,352 B1 * | 4/2022 | Keister | B60L 55/00 |
| 11,509,233 B1 * | 11/2022 | Keister | H02J 7/06 |
| 11,557,957 B1 * | 1/2023 | Abolhassani | H02M 3/003 |
| 2013/0163288 A1 | 6/2013 | Kim et al. | |
| 2014/0217997 A1 | 8/2014 | Hardman et al. | |
| 2015/0180352 A1 | 6/2015 | Mester et al. | |
| 2021/0028694 A1 | 1/2021 | Casalegno | |

FOREIGN PATENT DOCUMENTS

| CN | 103178706 A | 6/2013 |
| CN | 104768793 A | 7/2015 |
| CN | 105827120 A | 8/2016 |

(Continued)

*Primary Examiner* — Adolf D Berhane
(74) *Attorney, Agent, or Firm* — GableGotwals

(57) ABSTRACT

The invention provides a power converter apparatus for converting an alternating current (AC) power input to a direct current (DC) power output. The apparatus comprises a plurality of n single-phase power converting circuits arranged in parallel, where n is equal to or greater than 2, wherein one of said n single-phase power converting circuits comprises a single-stage AC/DC converter module having an operating AC/DC converter; and each of a remaining n−1 of said single-phase power converting circuits comprises a two-stage converter module having an AC/DC converter as an input stage and a DC/DC transformer as an output stage.

19 Claims, 5 Drawing Sheets

(56) References Cited

FOREIGN PATENT DOCUMENTS

| | | |
|---|---|---|
| CN | 109463029 A | 3/2019 |
| CN | 112311221 A | 2/2021 |
| CN | 112770451 A | 7/2021 |
| JP | 2016096591 A | 5/2016 |
| WO | 2017191245 A1 | 11/2017 |

* cited by examiner

POWER CONVERTER APPARATUS AND A METHOD OF MODULATING THEREOF

FIELD OF THE INVENTION

The invention relates to the field of electric power conversion, and particularly, but not exclusively, to a power conversion apparatus for converting an alternating current (AC) input to a direct current (DC) output with improved efficiency.

BACKGROUND OF THE INVENTION

Various electronic components including power converters for converting an alternating current (AC) power input to a direct current (DC) power output are known in the field. Particularly, a power supply with AC to DC (AC/DC) conversion at a light power load demonstrates low conversion efficiency which is attributed to the power consumption by other electronic components such as the digital control, the integrated circuit (IC), the magnetic core, etc. and because the driving power as well as the capacitive loss of these components are irrespective of the load power. For example, traditional power converters are generally configured with isolated converters connected in parallel, but this configuration has relatively low power efficiency, especially at a light power load. On the other hand, providing non-isolated converters in parallel may provide higher conversion efficiency but the arrangement suffers from circulating currents which is not desirable.

For example, PCT patent application publication no. WO 2017/191245 A1 discloses a converter system for converting a three-phase or a single-phase AC voltage into a DC voltage. The converter system comprises three converter branches each comprising a first input and a second input to be supplied with a single-phase AC voltage and a first output and a second output providing a DC voltage; wherein each converter branch comprises an AC-to-DC stage and a DC-to-DC stage connected between the first and second input and the first and second output.

Chinese patent no. CN 105827120B discloses a single phase, staggered power factor correction (PFC) circuit for use in an air conditioner. The circuit includes three branches arranged in parallel each including an inductor, a switching tube and a diode. The circuit obtains input current of an outdoor unit in the air conditioner or phase current of a compressor in the air conditioner; and controls the switching tube in each branch according to the input current of the outdoor unit or the phase current of the compressor, so that the staggered PFC circuit switches among three working states including three branches working in a staggered mode with a phase shift of 120 degrees, any two of the three branches working in a staggered mode with a phase shift of 180 degrees and any one of the three branches working in a Boost PFC mode to effectively improve the operating efficiency of a light load or no load.

U.S. Pat. No. 8,476,879 B2 discloses a method of controlling a power factor correction (PFC) converter having a single-phase system comprising a first PFC sub-circuit and a second PFC sub-circuit to determine when to transition the PFC converter between an interleaved mode and a saving energy mode (SEM). The method includes generating an amplified error signal based on a monitored output voltage of the PFC converter. The second PFC sub-circuit is disabled in response to the amplified error signal being less than a first threshold value and enabled in response to the amplified error signal exceeding a second threshold value.

US patent no. U.S. Ser. No. 11/011,992 B2 discloses a method and system for reducing a circulating current between a plurality of non-isolated modules operating in parallel. The input terminals and the output terminals of the plurality of non-isolated modules are respectively connected in parallel, and each of the non-isolated modules comprises a first stage converter, a bus capacitor and a second stage converter, which are electrically connected in sequence.

U.S. Pat. No. 7,948,222 B2 discloses a method of operating an asymmetric phase circuit topology comprising a power converter circuit operating a first phase switch circuit portion using a first number of switch devices when the power converter circuit is configured in a first mode of operation, with the first number being greater than zero; and operating a second phase switch circuit portion using a second number of switch devices when the power converter circuit is configured in the second mode of operation, with the second number being greater than the first number.

US patent no. U.S. Ser. No. 11/043,891 B1 discloses a controller for an AC to DC or a DC to AC multi-phase power converter of a type having N power converter phases arranged in parallel, where N is greater or equal to 2. The controller comprises a control module configured to change or vary a phase shift angle of the input current or output current for each of the N power converter phases such that an average phase shift value for each of said N power converter phases over a control module AC line cycle is about, near or substantially the same value.

There is therefore a need for a power converter which is capable of offering improved power efficiency.

OBJECTS OF THE INVENTION

An object of the present invention is to provide a novel power converter capable of offering improved power efficiency particularly at light power load.

Another object of the present invention is to mitigate or obviate to some degree one or more problems associated with known power converters, or at least to provide a useful alternative.

The above objects are met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a power converter apparatus for converting an alternating current (AC) power input to a direct current (DC) power output. The apparatus comprises a plurality of n single-phase power converting circuits arranged in parallel, where n is equal to or greater than 2, wherein one first single-phase power converting circuit of said n single-phase power converting circuits comprises a single-stage AC/DC converter module having an operating AC/DC converter, and each of remaining n−1 second single-phase power converting circuits comprises a two-stage converter module having an AC/DC converter as an input stage and a DC/DC transformer as an output stage.

In a second main aspect, the invention provides method of modulating a power converting apparatus. The apparatus comprises a plurality of n power converting circuits in parallel, wherein n is equal to or greater than 2. The method comprises providing one first single-phase power converting circuit comprising a one-stage AC/DC converter module having an AC/DC converter; and providing n−1 second single-phase power converting circuits each comprising a two-stage converter module having an AC/DC converter as an input stage and a DC/DC transformer as an output stage; automatically by-passing one or more of the output stage DC/DC transformers of the n−1 second single-phase power converting circuits when a load power of the apparatus is less than or equal to a predetermined, selected or calculated power threshold.

In a third main aspect, the invention provides a controller for use with the power converter apparatus of the first aspect. The controller is adapted to automatically by-pass one or more of the output stage DC/DC transformers of the second single-phase power converting circuits when load power of the apparatus is less than or equals to a predetermined, selected or calculated power threshold.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figure, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention relates to an electric power converter apparatus, and particularly, but not exclusively, to a power converter apparatus for converting an alternating current (AC) power input to a direct current (DC) power output. The power converter apparatus is configurable to automatically adjust and/or reduce the number of operating phases of the apparatus, for example, by converting a multi-phase operation such as a three-phase operation into a single-phase operation at light power load to thereby improve power conversion efficiency of the apparatus.

Figure 1:
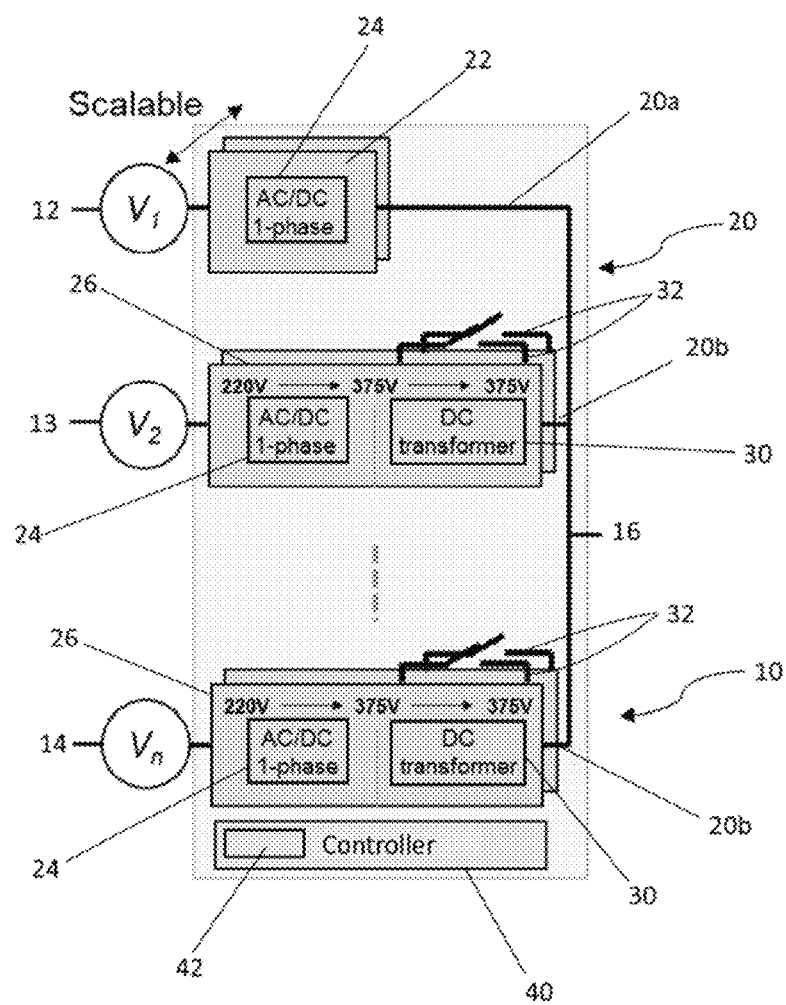
FIG. 1 is a circuit diagram showing a general structure of the power converter apparatus in accordance with an embodiment of the present invention.

Referring to FIG. 1, shown is a power converter apparatus 10 for converting an alternating current (AC) power input to a direct current (DC) power output. The power converter apparatus 10 can be connected with a single-phase or a multi-phase grid such as an AC mains power grid. The power converter apparatus 10 may comprise a plurality of n single-phase power converting phases or circuits 20 arranged in parallel, where n is a natural number equal to or greater than 2. The power converter apparatus 10 preferably comprises an asymmetric circuit topology, which will be described further below.

In one embodiment, the n single-phase power converting phases 20 comprise alone first single-phase power converting circuit 20a having a/one single-stage AC/DC converter module 22. Preferably, the single stage AC/DC converter module 22 comprises one AC/DC converter 24 connected between the power input 12 and the power output 16. Preferably, the single stage AC/DC converter module 22 comprises only AC/DC converter 24 as a single input/output stage. The n single-phase power converting phases 20 further comprises a remaining n−1 number of second single-phase power convening circuits 20b, each of which has a two-stage converter module 26 connected between their respective power inputs 13, 14 and the power output 16. Preferably, the two-stage converter module 26 comprises an AC/DC converter 24 as an input stage connected with a DC/DC transformer 30 as an output stage. Each of the AC/DC converters 24 is adapted to convert a single-phase AC voltage into an intermediate DC voltage, and each of the DC/DC transformers 30 is adapted to convert the intermediate DC voltage into a preferably different DC voltage provided to the power output 16. In one embodiment, the AC/DC converters 24 may comprise a rectifier, a power factor corrector, or the like; and the DC/DC transformers 30 may comprise an inverter, a transformer, a rectifier, or the like.

Figure 2:
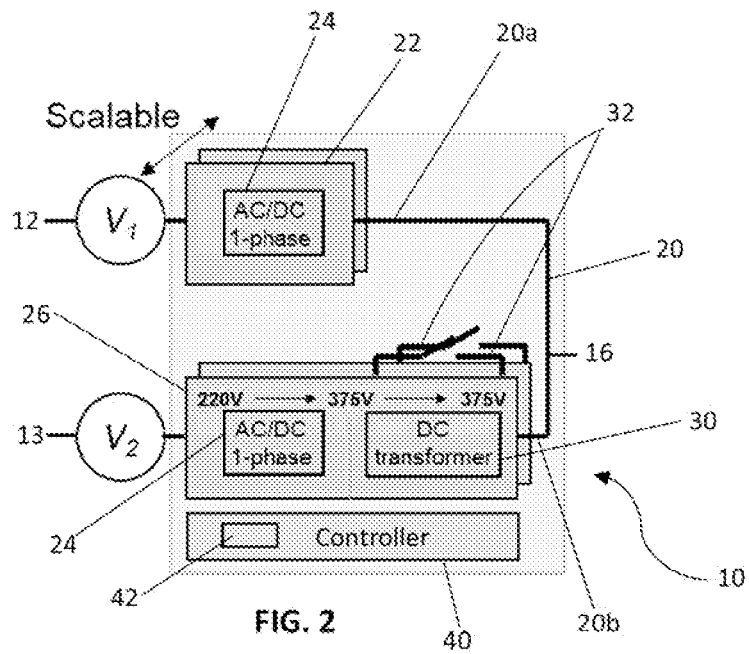
FIG. 2 is a circuit diagram showing the power converter apparatus having a two-phase topology in accordance with an embodiment of the present invention.

As shown in FIG. 2, for example, the power converter apparatus 10 may comprise a two-phase circuit having two (n=2) single-phase power converting phases 20, with one single-phase power converting circuit 20a having a single-stage AC/DC converter module 22; and another second single-phase power converting circuit 20b having a two-stage converter module 26. The apparatus 10 as shown in FIG. 2 can be connected with a 2-phase grid which may comprise two power inputs 12, 13 supplied with respective single-phase AC voltages. The power converter apparatus 10 preferably has one power output 16 providing a DC voltage.

Figure 3:
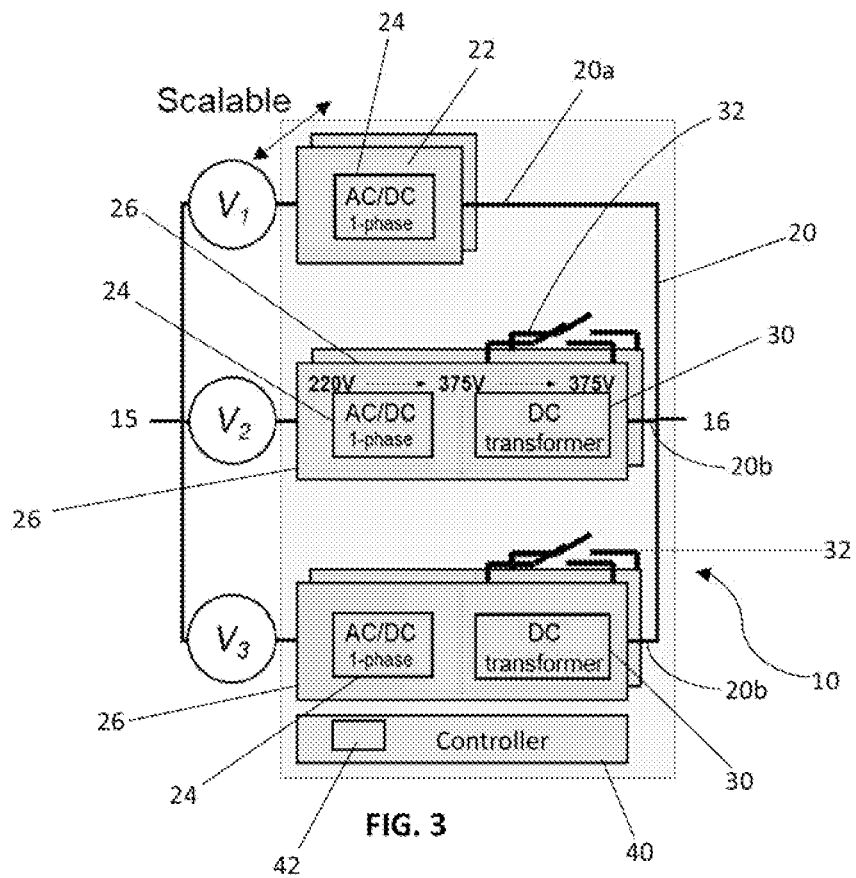
FIG. 3 is a circuit diagram showing the power converter apparatus having a three-phase topology in accordance with an embodiment of the present invention.

In another embodiment as shown in FIG. 3, the power converter apparatus 10 may comprise a three-phase circuit having three (n=3) single-phase power converting phases 20, with one single-phase power converting circuit 20a having a single-stage AC/DC converter module 22; and two (n−1=2) second single-phase power converting circuits 20b each having a two-stage converter module 26. In this embodiment, the apparatus 10 can be connected with a 3-phase grid which may comprise one power input 15 supplied with an AC voltage The power converter apparatus 10 preferably has one power output 16 providing a DC voltage.

Preferably, the power converter apparatus 10 may further comprise a controller or control module 40 for an adaptive modulation on the AC to DC power conversion. More preferably, the controller 40 is adapted to automatically adjust or modulate the number of operating power converting circuits 20 by disabling or by-passing one or more of the second single-phase power converting circuits 20b when a load power (P) of the power converter apparatus 10 is less than or equal to a predetermined, selected or calculated power threshold. In one specific embodiment, the power threshold can be determined by dividing a maximum load power (Pmax) of the apparatus 10 by the number n, i.e., the total number of single-phase power converting circuits 20 in the apparatus 10. The controller 40 is adapted to continuously monitor the load power (P) to thereby adaptively control the number power converting circuits 20 and more specifically, the number of second single-phase power converting circuits 20b operating to minimize power loss at light load.

For example, one or more of the second single-phase power converting circuits 20b can be configured with a switch 32 actuatable to by-pass the output stage DC/DC transformer 30 of the two-stage converter module 26 thereby converting said two-stage converter module 26 into a single stage AC/DC converter module. This is advantageous in that it obviates or mitigates power loss associated with the output stage DC/DC transformer 30. The switch 32 may be activated when the power converter apparats 10 is connected to a one-phase grid. The switch 32 may comprise any traditional electronic switch or circuit switch operable to by-pass the output stage DC/DC transformer 30 of the two-stage converter module 26. In one embodiment, the switch 32 can be provided in the form of a relay actuatable to bypass one or more of the DC/DC transformers 30 of the respective two-stage converter modules 26 in the second single-phase power converting circuits 20b to convert said two-stage converter modules 26 into single stage AC/DC converter modules. The number of second single-phase power converting circuits 20b converted in this way can be determined by the load power of the apparatus 10, that is, for the number of operating second single-phase power converting circuits 20b be dependent on the load power of the apparatus 10. For example, the controller 40 may convert one or more of the two second single-phase power converting circuits 20b of a 3-phase power converting circuit 20 when a reduced power load is detected.

In one embodiment, the single-stage converter module 22 of the first single-phase power converting circuit 20a may comprise a plurality of modules 22 connected in parallel, and each of the two-stage converter modules 26 of the second single-phase power converting circuits 20b may comprise a plurality of modules 26 connected in parallel. The numbers of said pluralities of single-stage converter modules 22 and two-stage converter modules 26 in the respective circuits can be the same or different. For example, the first single-phase power converting circuit 20a may comprise any number N of single-stage AC/DC converter modules 22, with N being any natural number equal to or greater than 2; while each of the second single-phase power converting circuits 20b may comprise any number N of two-stage converter modules 26. Yet in another embodiment, the respective number of single-stage converter modules 22 at the first single-phase power converting circuit 20a and two-stage converter modules 26 at the second single-phase power converting circuits 20b could be different. Furthermore, the number of two-stage converter modules 26 at each of the plurality of second single-phase power converting circuits 20b may also be the same or different. For example, one second single-phase power converting circuit 20b may comprise a number Ni of two-stage convert modules 26 and another second single-phase power converting circuit 20b may comprise a number $N_{ii}$ of two-stage convener modules 26, for example. Without being limited by any specific embodiments herein described and/or illustrated, a person skilled in the art will appreciate that any variations in the numbers of the converter modules 22, 26 and/or the numbers of the second single-phase power converting circuits 20b at the power circuit 20 shall be encompassed by the present invention, as long as the apparatus comprises an asymmetric topology with one first single-phase power converting circuit 20a having a single-stage power converter module 22 and at least one second single-phase power converting circuit 20b having a two-stage power converter module 26.

Preferably, a plurality of switches 32 such as relays can be arranged respectively one each at the plurality of two-stage converter modules 26 of the second single-phase power converting circuits 20b. The controller 40 may then actuate selectively one or more of said relays at the plurality of modules 26 of the same or different second single-phase power converting circuit 20b to bypass one or more of the respective DC/DC transformers 30 thereby converting one or more modules 26 and/or one or more second single-phase power converting circuits 20b into single stage AC/DC converter modules.

More preferably, the controller 40 is adapted to adjust or modulate the number of the single-stage AC/DC converter modules 22 of the first single-phase power converting circuit 20a based on a detected reference current ($I_{ref}$). For example, for the first single-phase power converting circuit 20a having N single-stage AC/DC converter modules 22 where N can be any natural number equal to or greater than 2, the controller 40 is adapted to reduce the number of the operating single stage AC/DC converter modules 22 from N to N−1 when the reference current ($I_r$) is detected to be less than or equal to a product (multiplication) of N−1 and a maximum current ($I_{max}$) of the power converter module 22. The controller 40 is therefore adapted to continuously monitor the reference current ($I_{ref}$) to thereby adaptively control the number of operating single-stage converter modules 22 so as to minimize power loss at light load.

Figure 4:
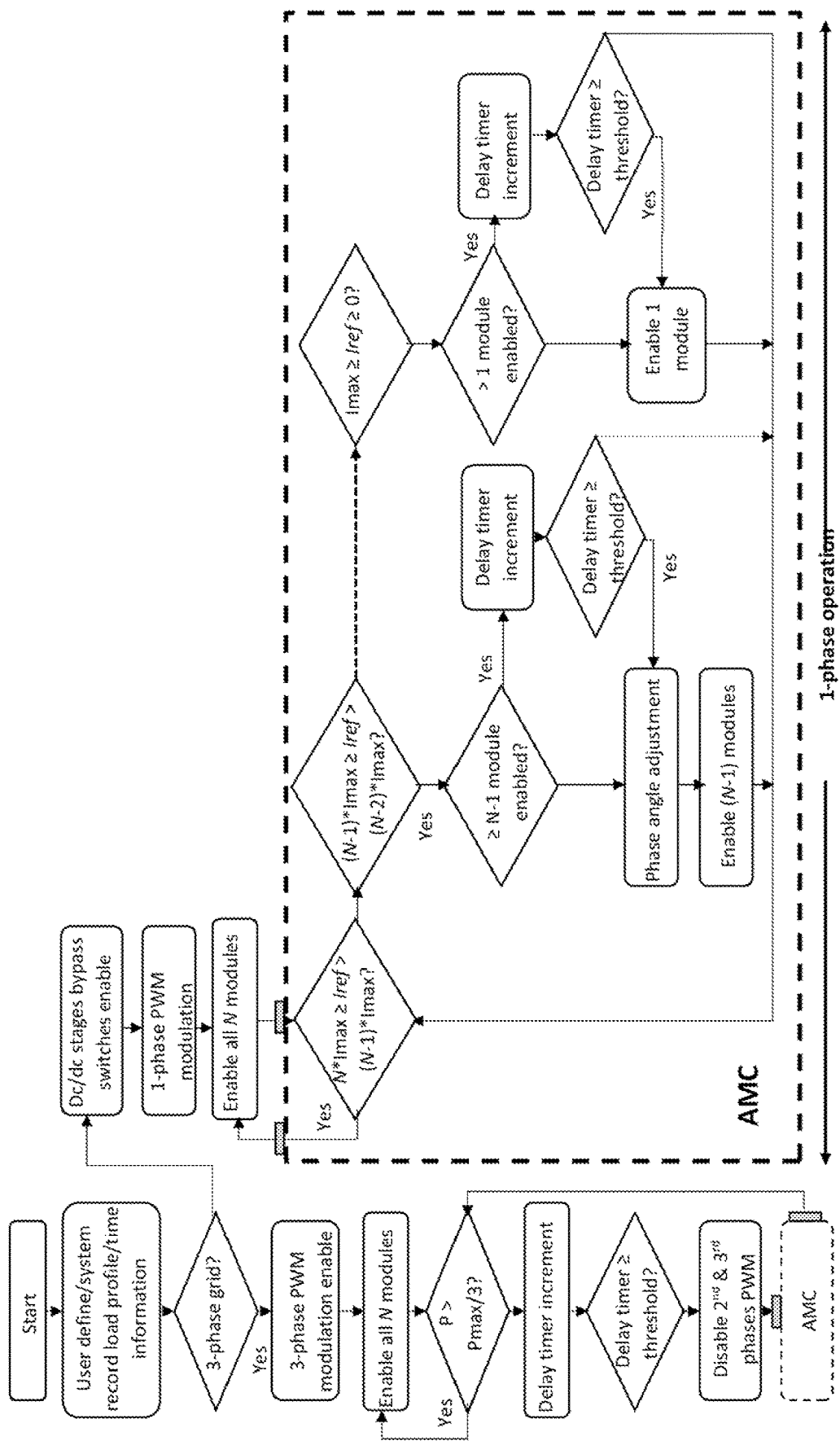
FIG. 4 is a flow diagram showing operation of the power converter apparatus of FIG. 3.

FIG. 4 further illustrates an exemplified operation of the apparatus 10 having a 3-phase circuit topology such as that as shown in FIG. 3. To start with, the apparatus 10 may be provided with a user defined and/or system detected or recorded power load profile and optionally, a preset delay time information such as a preset response time of the controller 40, depending on the application requirements of the apparatus 10. For example, based on a detected or user defined load power of the apparatus 10, the controller 40 may decide whether to execute a 3-phase operation or a single-phase operation. If a load power (P) which is larger than a threshold power, such as being determined by dividing the maximum load power ($P_{max}$) of the apparatus 10 by the total number of single-phase power converting circuits 20 (i.e. n=3), the apparatus 10 will be operated under all three phases and the controller 40 will enable all N—of the single-stage converter modules 22 of the one first single-phase power converting circuit 20a and the two-stage converter modules 26 of the two second single-phase power converting circuits 20b. On the other hand, if a load power (P) which is smaller than the threshold power is detected, the controller 40 will preferably disable the two second single-phase power converting circuits 20b of the power converting circuit 20, effectively converting the 3-phase operation into a single-phase operation to minimize power loss or actuate the switches 32 to bypass one or more of the respective DC/DC transformers 30 thereby converting the one or more modules 26 and thus the one or more second single-phase power converting circuits 20b into single stage AC/DC converter modules.

Preferably, a time delay module 42 can be provided which can be a part of the controller 40 or a separate component of the apparatus 10. Once a load power of less than the threshold power is detected and prior to the action of disabling or converting the second single-phase power converting circuits 20b, the time delay module 42 will determine a delay time for the controller 40 to respond. If the detected power load power (P) is low enough and/or the detected reference current ($I_{ref}$) is low enough, after the delay time has elapsed, the controller 40 will disable one or more of the modules 22, 26. If the delay time is determined to be greater than or equal to a predetermined, selected or calculated delay time threshold, the controller 40 will preferably automatically disable one or more of the two (i.e., n−1) second single-phase power converting circuits 20b. This is to ensure a slow response time for the controller 40 to respond to any load decrease detected to prevent disabling of one or more of the two (i.e., n−1) second single-phase power converting circuits 20b in response to momentary decreases in load, i.e., low load inverse power spikes. Alternatively, if the delay time is less than the delay time threshold, the controller 40 will allow continued operation of the second single-phase power converting circuits 20b until a delay time which meets or exceeds the delay time threshold is subsequently detected. The determining of the delay time is important in that it effectively slows down the response of the controller 40 to load decrease for a more stable control of the operation and thus power conversion by the apparatus 10.

In one embodiment, it is preferred that all of the n−1 second single-phase power circuits 20b be bypassed or disabled, leaving only the/one first single-phase power converting circuit 20a at light power load to thereby improve conversion efficiency of the apparatus 10. However, it is also possible that only one or more but not all of the n−1 second single-phase power circuits 20 be disabled or by-passed, depending on the load decrease detected.

After a light power load is detected and the apparatus is effectively converted to a single-phase operation, the controller 40 will then modulate the number of the plurality of single-stage converter modules 22 based on an adaptive modulation control (AMC), as shown in FIG. 4. For example, for a first single-phase power convening circuit 20a having N single-stage converter modules 22 each having one AC/DC converter 24, where N is any natural number equal to or greater than 2, the controller 40 is adapted to reduce number of the single-stage AC/DC converter modules 22 from N to N−1 when a reference current ($I_{ref}$) of less than or equal to a multiplication of N−1 with a maximum current (In) of the converter module 22, i.e. $N-1*I_{mas} \geq I_{ref}$ is detected; and more preferably, when the reference current ($I_{ref}$) detected might be greater than a multiplication of N−2 with the maximum current ($I_{max}$), that is, it falls within the range of $N-1*I_{mas} \geq I_{ref} > N-2*I_{mas}$. The controller 40 will continue to monitor the reference current ($I_{ref}$) and adjust the number of the operating single-stage converter modules 22 by a consecutive reduction on the number, i.e., one at a time during the iteration until the lowest operable number of the single-stage converter modules 22 is reached. On the other hand, if a reference current ($I_{ref}$) which is greater than ($N-1*I_{mas}$) is detected, the controller 40 will continue to enable all N number of the single-stage converter modules 22.

Preferably, prior to reducing the number of the plurality of single-stage modules 22, the time delay module 42 will be arranged to determine the delay time and if the delay time is greater than or equal to the predetermined, selected or calculated delay time threshold, the controller 40 executes the disabling or by-passing of one/each of the single-stage modules 22. Again, the determination of the delay time slows down the response of the controller 40 to load decrease such that a more stable operation can be achieved. Optionally, an adjustment to the phase angle will also be conducted prior to the execution of the disabling of one/each of the single-stage modules 22. The converter modules are preferably interleaved in operation such that each convert module has a respective phase angle in switching signal different to other converter modules. The phase angle difference is dependent on the pulse wave modulated (PMW) signal of the converter apparatus 10. The phase angle difference is dependent on the result of 360°/N where N is the number of converter modules. Any ripple on the input AC current can be mitigated or minimized if the phase angles are properly adjusted.

Preferably, the AC/DC converter 24 of the one-stage converter module 22 of the first single-phase power converting circuit 20a is non-isolated; whereas the DC/DC transformers 30 of the two-stage converter modules 26 of the n−1 second single-phase power converting circuits 20b are preferably isolated, for example, in the form of galvanically separating transformers.

In another not shown embodiment of the power converter apparatus 10, the first single-phase power converting circuit 20a may comprise a two-stage converter module comprising an AC/DC converter 24 as an input stage connected with a DC/DC transformer 30 as an output stage, but where the DC/DC transformer 30 is preferably permanently by-passed through, for example, permanent actuation of one or more by-pass switches or at least temporarily by-passed through actuation of said one or more by-pass switches. In this embodiment, the concept of the invention can be realized without requiring two different converter module configurations, namely all of the converter modules have the same two-stage configuration but a first one of said modules is configured to perform only as a single stage converter module.

In another aspect of the present invention there is provided a method of modulating a power converting apparatus 10. The apparatus 10 preferably comprises a plurality of n power converting circuits 20 in parallel, wherein n is a natural number equals to or greater than 2. The method comprises the providing of one first single-phase power converting circuit 20a having a one-stage AC/DC converter module 22 with preferably only an AC/DC converter 24, and n−1 second single-phase power converting circuits 20b each comprising a two-stage converter module 26 having an AC/DC converter 24 as an input stage and a DC/DC transformer 30 as an output stage. The method further comprises an automatic by-passing of one or more of the output stage DC/DC transformers of the n−1 second single-phase power converting circuits 20b when a load power of the apparatus 10 is less than or equal to a predetermined, selected or calculated power threshold.

Preferably, the one-stage AC/DC converter module 24 of the first single-phase power converting circuit 20a comprises a plurality of N one-stage AC/DC converter modules 24, where N is equal to or greater than 2. The method further comprises the determining of an operating current as a reference current ($I_{ref}$) of the first single-phase power converting circuit 20a, and adjusting number of the one-stage AC/DC converter modules 24 from N to a N−1 when the reference current ($I_{ref}$) determined is less than or equal to a multiplication of N−1 with a maximum current ($I_{max}$) of the apparatus, i.e. $N-1*I_{mas} \geq I_{ref}$; and more preferably, when the reference current ($I_{ref}$) determined might as well greater than a multiplication of N−2 with the maximum current ($I_{max}$), that is, falls within the range of $N-1*I_{mas} \geq I_{ref} > N-2*I_{mas}$.

In one embodiment, the method further comprises the step of determining a delay time prior to the by-passing and/or adjusting steps and, if the determined delay time is greater than or equal to a predetermined, selected or calculated delay time threshold, executing the by-passing and/or adjusting steps.

In yet a further aspect of the present invention, there is provided a controller or control module 40 for use with the power converter apparatus 10 as described above. The controller 40 is adapted to automatically by-pass one or more of the output stage DC/DC transformers of the second single-phase power converting circuits 20b when the load power of the apparatus 10 is less than or equals to a predetermined, selected or calculated power threshold. Preferably, when the one-stage AC/DC converter module 22 of the first single-phase power converting circuit 20a comprises a plurality of N one-stage AC/DC converter modules 22, where N is equal to or greater than 2, the controller is adapted to adjust number of the plurality of one-stage AC/DC converter modules 22 from N to N−1 when a detected reference current ($I_{ref}$) of the apparatus is less than or equal to a multiplication of N−1 with a maximum current ($I_{max}$) of the apparatus; and more preferably, when the reference current ($I_{ref}$) determined might as well greater than a multiplication of N−2 with the maximum current ($I_{max}$), that is, falls within the range of $N-1*I_{mas} \geq I_{ref} > N-2*I_{mas}$.

In one further embodiment, the controller 40 is further provided with a time delay module 42 for determining a delay time. Preferably, the controller 40 is adapted to by-pass one or more of the second single-phase power converting circuits 20b and/or adjust number of the plurality of one-stage AC/DC converter modules 22 of the first single-phase power converting circuit 20a from N to N−1 based on the above-described operating conditions only when the determined delay time is greater or equals to a predetermined, selected or calculated delay time threshold.

Figure 5:
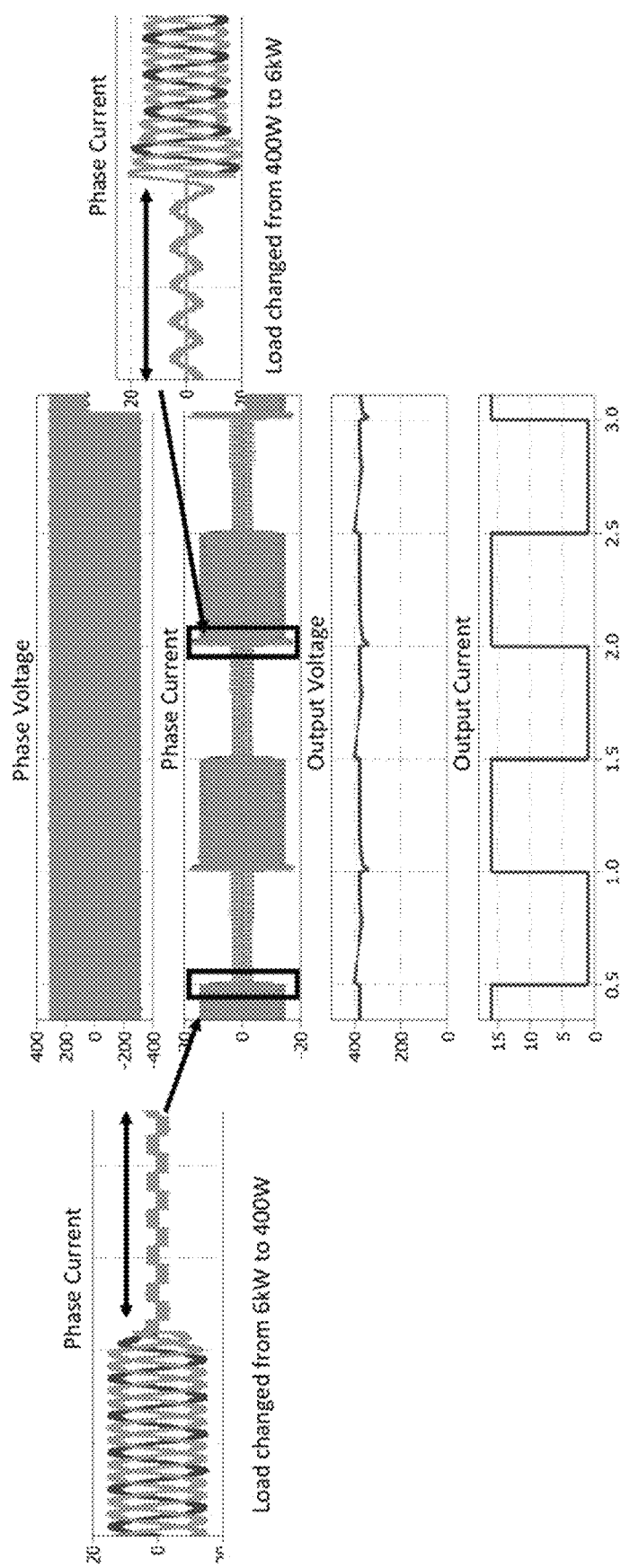
FIG. 5 shows the waveforms generated by the power converter apparatus of FIG. 3.
Figure 6:
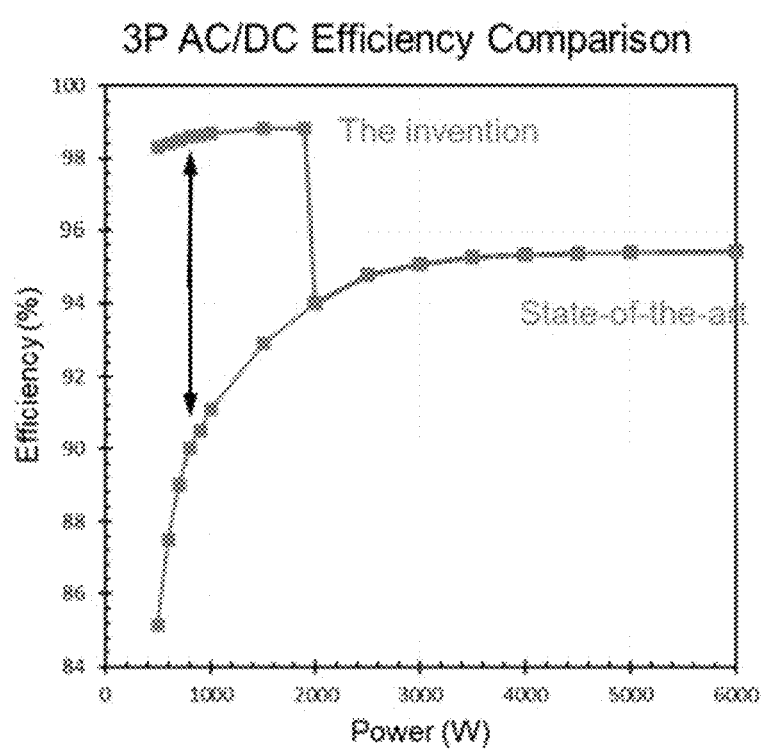
FIG. 6 shows the power efficiencies of the power converter apparatus of FIG. 3 in comparison to a conventional power converter apparatus.

FIG. 5 illustrated a plurality of waveforms showing the phase voltage, phase current, output voltage and output current under the power conversion process by a 3-phase power converter according to an embodiment of the present invention. Particularly, in response to a change of power load from 6 kW to 400 W, i.e., from a high power load to a light power load, the phase current is converted accordingly from a 3-phase current to a single phase current; and when the power load is changed from 400 W to 6 kW, i.e. from a light power load to a high power load, the phase current is converted accordingly from the single phase current to a 3-phase current. It is demonstrated that at the light load where only a single phase is operating, a power conversion efficiency of higher than 98% is achievable. It is further illustrated in FIG. 6 that an increase of about 5% to about 13% in efficiency is achievable by converting a 3-phase operation to a single-phase operation of the present invention at a light load of below 1000 W when compared with the prior art technology.

The present invention is therefore advantageous in that it provides an electric power converter apparatus for converting an alternating current (AC) power input to a direct current (DC) power output. The power converter apparatus is configured with an asymmetric topology having preferably one first single-phase power converting circuit having preferably only one single-stage AC/DC converter module, and at least one second single-phase power converting circuit having a two-stage AC/DC and DC/DC converter module. Preferably, the apparatus is adapted to disable or by-pass one or more of the second single-phase power converting circuits at a light power load, i.e. when the power of apparatus is determined to be less than or equals to $P_{max}/n$, where $P_{max}$ being the maximum power operable at the apparatus and n being any number greater than or equals to 2, so as to reduce power loss and thus improves power efficiency of the apparatus at light power load. More preferably, the first single-phase power converting circuit may comprise a plurality of N single-stage AC/DC converter modules, where N being any number greater than or equals to 2. The number of the single-stage AC/DC converter modules are scalable by way of consecutively reducing the number N of operating single-stage modules based on a reference current ($I_{ref}$) when $I_{ref}$ falls within the condition of $N-1*I_{mas} \geq I_{ref} > N-2*I_{mas}$, where $I_{max}$ being the maximum current operable at the apparatus. The scalability or adjustability on the number of operating single-stage AC/DC converter modules enables a further reduction on the phase current when the apparatus is under a single-phase operation to minimize power loss and thus, enhances power conversion efficiency of the apparatus.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims hereof, any element expressed as a means for performing a specified function is intended to encompass any way of performing that function. The invention as defined by such claims resides in the fact that the functionalities provided by the various recited means are combined and brought together in the manner which the claims call for. It is thus regarded that any means that can provide those functionalities are equivalent to those shown herein.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A power converter apparatus for converting an alternating current (AC) power input to a direct current (DC) power output, the apparatus comprising:
  a plurality of n single-phase power converting circuits arranged in parallel, where n is equal to or greater than 2, wherein:
  one of said n single-phase power converting circuits comprises a single-stage AC/DC converter module having an AC/DC converter;
  each of a remaining n−1 of said single-phase power converting circuits comprises a two-stage converter module having an AC/DC converter as an input stage and a DC/DC transformer as an output stage; and
  a controller adapted to automatically disable or by-pass one or more of the output stage DC/DC transformers of the n−1 single-phase power converting circuits when load power of the power converter apparatus is less than or equal to a predetermined, selected or calculated power threshold.

2. The power converter apparatus according to claim 1, wherein said one of said n single-phase power converting circuits comprises a first single-phase power converting circuit, the single-stage AC/DC converter module of said first single-phase power converting circuit comprising N single-stage AC/DC converter modules arranged in parallel, each of the N single-stage AC/DC converter modules comprising an AC/DC converter, where N is equal to or greater than 2.

3. The power converter apparatus according to claim 2, wherein one or more of said n−1 single-phase power converting circuits comprise second single-phase power converting circuits with one or more of the two-stage converter modules of the second single-phase power converting circuits each comprising a plurality of two-stage converter modules arranged in parallel, each of the plurality of two-stage converter modules comprising an AC/DC converter as an input stage and a DC/DC transformer as an output stage.

4. The power converter apparatus according to claim 3, wherein the second single-phase power converting circuits comprise a switch actuatable to by-pass one or more of the output stage DC/DC transformers of said second single-phase power converting circuits.

5. The power converter apparatus according to claim 4, wherein the switch comprises a plurality of relays arranged one at each of the respective second single-phase power converting circuits, each relay being actuatable to bypass one or more of the DC/DC transformers of the respective two-stage converter modules.

6. The power converter apparatus according to claim 1, wherein the predetermined, selected or calculated power threshold is determined by dividing a maximum load power (Pmax) of the power converter apparatus by n.

7. The power converter apparatus according to claim 2, wherein the controller is adapted to adjust a number of the N single-stage AC/DC converter modules of the first single-phase power converting circuit based on a reference current ($I_{ref}$).

8. The power converter apparatus according to claim 7, wherein the controller is adapted to reduce number of the single stage AC/DC converter modules from N to N−1 when the reference current ($I_{ref}$) is less than or equal to a product of N-1 and a maximum current ($I_{max}$) of the power converter module.

9. The power converter apparatus according to claim 1, further comprising a time delay module adapted to determine a delay time for disabling or by-passing one or more of the convert modules.

10. The power converter apparatus according to claim 9, wherein the controller is adapted to automatically disable or by-pass one or more of the second single-phase power converting circuits when a delay time is greater than or equal to a predetermined, selected or calculated delay time threshold and when the load power of the apparatus is less than or equal to a predetermined, selected or calculated power threshold.

11. The power converter apparatus according to claim 9, wherein the controller is adapted to reduce a number of the single-stage AC/DC converter modules from N to N−1 when a delay time is greater than or equal to a predetermined, selected or calculated delay time threshold and when the reference current ($I_{ref}$) is less than or equal to a product of N−1 and a maximum current ($I_{max}$) of the power converter apparatus.

12. The power converter apparatus according to claim 1, wherein the power converter apparatus is connected to an n-phase grid having a plurality of n AC inputs and one DC output; or having only one AC input and one DC output.

13. The power converter apparatus according to claim 1, wherein the AC/DC converter of the one-stage converter module of the first single-phase power converting circuit is non-isolated; and the DC/DC transformers of the two-stage converter modules of the n−1 second single-phase power converting circuits are isolated.

14. A controller for use with the power converter apparatus according to claim 1, wherein the controller is adapted to automatically disable or by-pass one or more of the output stage DC/DC transformers of the second single-phase power converting circuits when load power of the apparatus is less than or equal to a predetermined, selected or calculated power threshold.

15. The controller according to claim 14, wherein the one-stage AC/DC converter module of the first single-phase power converting circuit comprises a plurality of N one-stage AC/DC converter modules, where N is equal to or greater than 2; wherein the controller is adapted to adjust a number of the plurality of one-stage AC/DC converter modules from N to N−1 when a detected reference current ($I_{ref}$) of the apparatus is less than or equal to a product of N−1 and a maximum current ($I_{max}$) of the apparatus.

16. The controller according to claim 14, further comprising a time delay module for determining a delay time; wherein the controller is adapted to disable or by-pass one or more of the second single-phase power converting circuits when the determined delay time is greater than or equal to a predetermined, selected or calculated delay time threshold.

17. A method of modulating a power converting apparatus, the apparatus comprising a plurality of n power converting circuits in parallel, wherein n is equal to or greater than 2, the method comprising:
providing one first single-phase power converting circuit comprising a one-stage AC/DC converter module having an AC/DC converter; and
providing n−1 second single-phase power converting circuits each comprising a two-stage converter module having an AC/DC converter as an input stage and a DC/DC transformer as an output stage; and
automatically disabling or by-passing one or more of the output stage DC/DC transformers of the n−1 second single-phase power converting circuits when a load power of the apparatus is less than or equal to a predetermined, selected or calculated power threshold;
wherein the method further comprises determining a delay time prior to the disabling or by-passing step and, if the determined delay time is greater than or equal to a predetermined, selected or calculated delay time threshold, executing the disabling or by-passing step.

18. The method according to claim 17, wherein the one-stage AC/DC converter module of the first single-phase power converting circuit comprises a plurality of N one-stage AC/DC converter modules, where N is equal to or greater than 2, the method further comprising the step of:
determining an operating current as a reference current ($I_{ref}$) of the first single-phase power converting circuit; and
adjusting a number of the one-stage AC/DC converter modules from N to a N−1 when the reference current ($I_{ref}$) is determined to be less than or equal to a product of N−1 and a maximum current ($I_{max}$) of the power converter apparatus.

19. A method of modulating a power converting apparatus, the apparatus comprising a plurality of n power converting circuits in parallel, wherein n is equal to or greater than 2, the method comprising: providing one first single-phase power converting circuit comprising a plurality of N one- stage AC/DC converter modules each having an AC/DC converter, where N is equal to or greater than 2; determining an operating current as a reference current (Iref) of the first single-phase power converting circuit; providing n−1 second single-phase power converting circuits each comprising a two-stage converter module having an AC/DC converter as an input stage and a DC/DC transformer as an output stage; and automatically disabling or by-passing one or more of the output stage DC/DC transformers of the n−1 second single-phase power converting circuits when a load power of the apparatus is less than or equal to a predetermined, selected or calculated power threshold; adjusting a number of the one-stage AC/DC converter modules from N to a N−1 when the reference current (Iref) is determined to be less than or equal to a product of N−1 and a maximum current (Imax) of the power converter apparatus.

* * * * *